Sept. 1, 1953            R. B. HOPKINS            2,650,668

TORSION SPRING MOUNTING OF TRACTOR DRIVE WHEELS

Filed June 9, 1949

INVENTOR.
RICHARD B. HOPKINS
BY
ATTORNEY

Patented Sept. 1, 1953

2,650,668

UNITED STATES PATENT OFFICE 2,650,668

TORSION SPRING MOUNTING OF TRACTOR DRIVE WHEELS

Richard B. Hopkins, Waukesha, Wis.

Application June 9, 1949, Serial No. 98,081

6 Claims. (Cl. 180—71)

This invention relates to improvements in the springing of land vehicles and particularly to the springing of tractors of the wheel type.

Present tractors, whether designed for industrial or farm use, are not provided with springs excepting insofar as the seat mounting may be resilient or insofar as the seats are provided with resilient cushions. Consequently, such tractors are hard-riding and cannot be safely driven above speeds dependent on the roughness of the surfaces over which the tractor is operating. When the tractor is driven transversely of the rows made in cultivating row crops, the speed of the tractor is especially limited because of the rolling and pitching of the tractor in passing over the rows and the furrows therebetween.

It is, therefore, an object of the present invention to provide springing for land vehicles of which the centers of the wheels are in a line other than the axis of the wheel-vehicle body attachment and about which the wheels and their attachment may oscillate.

Another object of the present invention is to provide springing for land vehicles and particularly for the drive wheels of tractors of the wheel type or for the tracks of a track type tractor.

Another object of the invention is to provide torsion springs for land vehicles with wheels in which the wheel centers are in a line other than the axis of the drive shaft for such wheels.

Objects and advantages other than those above set forth will be apparent from the following description when read in connection with the accompanying drawing in which.

Figure 1:
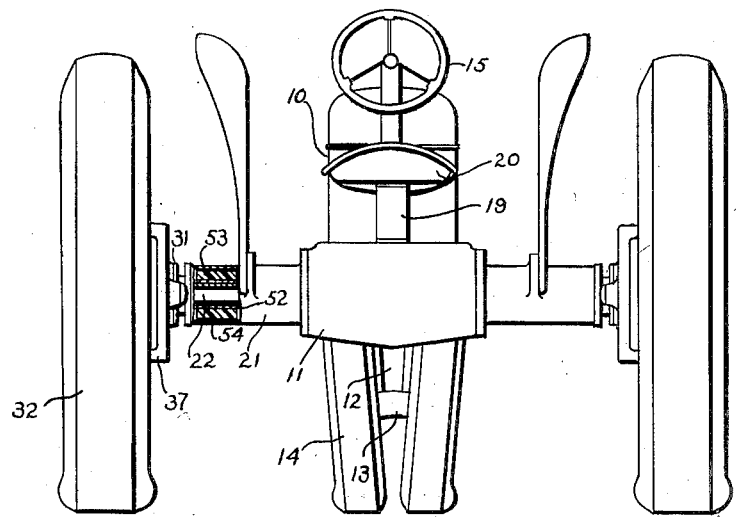
Fig. 1 is a rear view of a wheel type tractor with a portion of the housing for a driving shaft thereof broken away.

Generally, the present invention provides a torsion spring surrounding a drive shaft at some distance from an axle on which is mounted a ground engaging wheel or track. In the embodiments of the invention, a tube is supported rotatably relative to the casing about the drive shaft and extends from such casing. A housing for power transmission means from the drive shaft to a wheel axle and supporting the wheel axle itself, is fixed to the tube to extend at an angle therefrom for locating the center of the wheel axle a considerable distance away from the drive shaft axis. A torsion spring is fixed between the drive shaft casing and the tube. In the case of a wheel type tractor, for example, the drive shaft axis is thus parallel with but considerably spaced from the center of the wheel axle, due to the reduced speed usually desired between the drive shaft and the axle.

Hence, movement of the wheel axle acts, in both embodiments, through a considerable lever arm on the springs and thus allows considerable wheel movements to be taken up by the springs without affecting the driver of the tractor.

Referring to the drawings in which like reference numerals relate to like parts, the reference numeral 10 generally designates an engine driven tractor in which the transmission housing, the propeller shaft housing (neither of which is shown) and the differential housing 11 form the frame supporting the engine. At the forward end of the tractor a support 12 extends downwardly and has mounted thereon an axle 13 for the front wheels 14 which are turned by the usual steering wheel 15. Mounted on one of the housings, such as the propeller shaft housing, is a resilient bar 19 supporting a seat 20 for the tractor operator. Casings 21 extend laterally from the ends of the differential housing 11 and severally enclose drive shafts 22 with a gear 23 of relatively small size fixed on the end thereof. All of the housings and casings above indicated also coact to form a substitute for a frame. Several different makes of so-called "frameless" tractors, such as above indicated, are now on the market and no further description of such structure is believed necessary.

Figures 2, 3, 4:
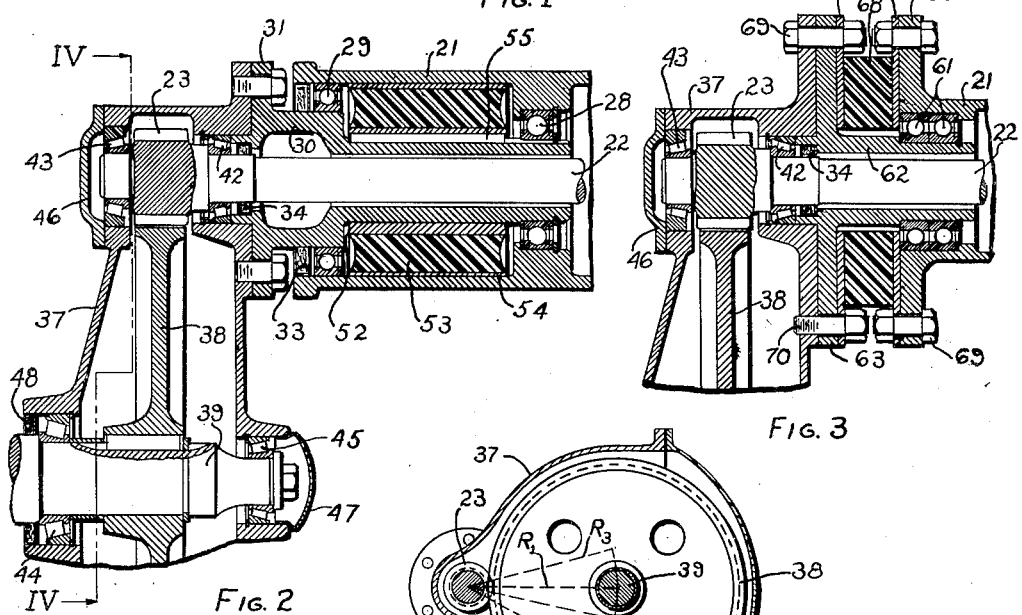
Fig. 2 is an enlarged section of a portion of the drive shaft and its housing and of the driving gears and their housing and of the axle receiving one of the driving wheels, in combination with a torsion spring as one embodiment of the present invention.
Fig. 3 is a view similar to Fig. 2 of a modified form of the present invention.
Fig. 4 is a diagrammatic view on the plane of line IV—IV of Fig. 2 to show the relationship of the axes of the drive shaft and of the driven wheel axle.

Referring to Figs. 1 and 2, the casing 21 receives bearings 28 and 29 in which is supported a tubular member 30 with a flange 31 to which is fixed a portion of the supporting structure for the rear wheels 32. The space between the drive shaft casing 21 and the tube 30 is closed by a seal 33 and the space between the drive shaft 22 and the tube 30 is closed by a seal 34. The flange 31 on tube 30 has fixed thereto a housing 37 enclosing the gear 23 and a gear 38 meshing therewith, the gear 38 being fixed on an axle 39 on which one of the rear tractor wheels is mounted.

The drive shaft 22 is supported in bearings 42 and 43 in housing 37 and the axle 39 is supported in bearings 44 and 45 also in such housing. It will be seen that the housing 37 has an aperture for access to the bearing 43 which aperture is provided for a cover 46, and that a second aperture is also provided in such housing at one end of the axle 39 for access to the bearing 45, which second aperture is closed by a cover 47. The space between the housing 37 and the axle 39 where the axle extends from such housing to receive the wheel 32, is closed by a seal 48.

It will be understood that the tube 30 may be oscillatably or rotatably supported in bearings 28 and 29 but such rotation relative to the casing 21, is limited by a torsion spring. Such spring is shown in Fig. 2, as comprising an inner sleeve 52 fixed to the inner cylindrical surface of a hollow cylinder 53 of resilient material and an outer sleeve 54 fixed to the outer cylindrical surface of the member 53. The inner sleeve 52 is fixed to the tube 30 as by a key 55 while the outer sleeve 54 of the torsion spring is press-fitted into the casing 21. The sleeves of the torsion cylinder are permanently joined to the spring as by vulcanizing and the torsion spring is pressed into the casing as a unit.

Referring to the embodiment of the invention shown in Fig. 3, casing 21 is flanged as at 60 and receives bearings 61 in which is supported tubular member 62 having a flange 63. The flange 63 of the tubular member is connected with the housing 37. Flanges 60 and 63 are spaced from each other to provide an annular space in which is mounted a torsion spring. In the present construction the torsion spring comprises annular plates 66 and 67 severally fixed to the two sides of a resilient member 68 which is now in annular form or formed as a short heavy-walled hollow cylinder. The plates are fastened respectively to flanges 60 and 63 by bolts 69 or screws 70.

Under some circumstances, it may be desirable to provide a cover over at least the upper portion of the tube end and transmission housing thus preventing the jamming of stones, etc., between the several flanges.

It can be seen by reference to Fig. 4 that the wheel axle 39 may swing about a center on the axis of shaft 22 on the radius R which provides a considerable lever arm. R indicates a line beginning at the center of the drive shaft 22 and drive gear 23 and extending to the center of driven gear 38, axle 39 and wheel 32. The position of line R represents the condition at which the torsion spring 53 is not under load. In other words, the wheel, the tire, the transmission housing, etc., are supported by the ground and the weight of the frame, the engine, etc., are assumed to be so supported as not to be borne by the spring acting through the wheel 32. As the weight of the frame, etc., is applied to the spring, the line R moves through an arc to the position $R_1$ which is the normal position of the wheel center under static conditions of the tractor, that is, when the spring supports its normal portion of the tractor weight. (The vertical travel of the wheel center from position R to position $R_1$ is comparable to the static deflection of a leaf spring.) The amount of static deflection determines the natural frequency of vibration of the spring and, to some extent, the degree of comfort obtained by the rider.

The wheel may move either up or down from the position $R_1$ dependent on the surface inequalities encountered. As the wheel moves upward, the torsion spring absorbs energy and the spring releases the stored energy as the wheel moves downward. Hence, the spring absorbs or reduces the severity of the shocks transmitted to the spring supported portions of the tractor.

Figure 5:
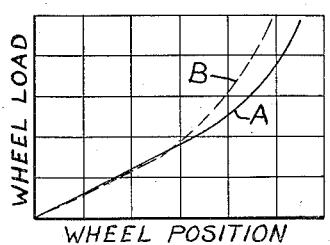
Fig. 5 is a graph showing the action of a structure embodying the present invention.

In Fig. 5, the intersection of the abcissa and the ordinate represents the relationship between displacement and load for the no-load position R as shown in Fig. 4. Curve A illustrates the relationship between vertical wheel displacement and the load required to displace the wheel. Curve B illustrates the relationship between the wheel load and wheel displacement when the wheel starts from an initial position of $R_2$ and moves to a normal static position of $R_3$. Since curves A and B do not coincide, it will be seen that the relationship between load and displacement can be varied through variation of the angular relationship between the initial positions such as $R_1$ and $R_2$ and the ground by change in the effective length of the lever arm.

It will thus be seen that the present invention provides means for springing a vehicle in which the wheel is mounted at a distance from the axis of the drive shaft supplying power to the wheel. The wheels oscillate about such axis to store energy or to release energy from the springs as required. The present construction requires the minimum of change from present tractor constructions and, in fact, requires no change whatever in the present drive shaft and wheel axle relationships. The wheels are free to move through an arc with no change whatever in the driving element relationships other than change in angular position of the axles, and about the center of the drive shaft. The wheel axle acts at the end of a considerable lever arm from the center of the drive shaft so that wheel movement is readily converted into energy stored in the spring or returned by the spring as the wheel moves in opposite directions. It is not essential that the angular relation between the drive shaft casing and wheel axle housing be a right angle, and any type of means may be employed for transmitting power between the drive shaft and the axle.

Although but two embodiments of the present invention have been illustrated and described, it will be apparent to those skilled in the art that various changes and modifications may be made therein without departing from the spirit of the invention or from the scope of the appended claims.

I claim:

1. In an automotive vehicle having a drive shaft extending laterally from the differential housing thereof, a tubular casing fixed on the differential housing and enclosing the drive shaft, the differential housing and the drive shaft casing forming a portion of the vehicle frame, a tube rotatably mounted in and extending from the casing and having the drive shaft extending therethrough, bearings supporting the tube within the casing, a housing fixed on the tube and extending therefrom at a right angle to the axis of the drive shaft, a wheel axle rotatably mounted in the housing, gearing connecting the drive shaft with the axle, and a compressible and torsionally elastic member joining the casing with the tube for restraining oscillation of the axle about the drive shaft axis and for absorbing shocks acting on the axle housing.

2. In an automotive vehicle having a drive shaft extending laterally from the differential housing thereof, a tubular casing fixed on the differential housing and enclosing the drive shaft, the differential housing and the drive shaft casing forming a portion of the vehicle frame, a tube rotatably mounted in and extending from the casing and having the drive shaft extending therethrough, bearings supporting the tube within the casing, a housing fixed on the tube and extending therefrom at a right angle to the axis of the drive shaft, a wheel axle rotatably mounted in the housing, gearing connecting the drive shaft with the axle, and a compressible and torsionally elastic member fixed between the casing and the tube in torsion transmitting and shock absorbing relation.

3. In an automotive vehicle having a drive shaft extending laterally from the differential housing thereof, a tubular casing fixed on the differential housing and enclosing the drive shaft, the differential housing and the drive shaft casing forming a portion of the vehicle frame, a tube rotatably mounted in and extending from the casing and having the drive shaft extending therethrough, the tube being coaxial with and spaced from the casing, bearings supporting the tube within the casing, a housing fixed on the tube and extending therefrom at a right angle to the drive axis, a wheel axle rotatably mounted in the housing, gearing connecting the drive shaft and the axle, a torsionally elastic and compressible member filling the space between the casing and the tube and being fixed thereto against axial or rotational movement relative thereto, the member being of a length materially less than the length of the casing.

4. In an automotive vehicle having a drive shaft extending laterally from the differential housing thereof, a tubular casing fixed on the differential housing and enclosing the drive shaft, the differential housing and the drive shaft casing forming a portion of the vehicle frame, a tube rotatably mounted in and extending from the casing and having the drive shaft extending therethrough, the tube being coaxial with and spaced from the casing, bearings supporting the tube within the casing, a housing fixed on the tube and extending therefrom at a right angle to the drive axis, a wheel axle rotatably mounted in the housing, gearing connecting the drive shaft and the axle, and a torsion spring joining the casing with the tube, the spring comprising an outer sleeve press-fitted into the casing adjacent one end thereof, an inner sleeve fitted over the tube and keyed thereto and spaced from the outer sleeve, and a compressible and elastic solid member fixedly joined with the sleeves in torsion transmitting and shock-absorbing relation.

5. In an automotive vehicle having a drive shaft extending laterally from the differential housing thereof, a flanged tubular casing fixed on the differential housing and enclosing the drive shaft, the differential housing and the drive shaft casing forming a portion of the vehicle frame, a flanged tube rotatably mounted in and extending from the drive shaft casing and having the drive shaft extending therethrough, the casing flange and the tube flange co-acting for substantially defining an annular space, bearings supporting the tube within the drive shaft casing, a wheel housing fixed on the tube flange and extending therefrom at a right angle to the axis of the drive shaft, a wheel axle rotatably mounted in the last said housing, gearing connecting the drive shaft with the axle, and a compressible and torsionally elastic member mounted in the space between and joining the casing and tube flanges for restraining oscillation of the axle about the drive shaft axis and for absorbing shocks and vibrations acting on the axle and the wheel housing.

6. In an automotive vehicle having a drive shaft extending laterally from the differential housing thereof, a flanged tubular casing fixed on the differential housing and enclosing the drive shaft, the differential housing and the drive shaft casing forming a portion of the vehicle frame, a flanged tube rotatably mounted in and extending from the drive shaft casing and having the drive shaft extending therethrough, the casing flange and the tube flange co-acting for substantially defining an annular space, bearings supporting the tube within the drive shaft casing, a wheel housing fixed on the tube flange and extending therefrom at a right angle to the axis of the drive shaft, a wheel axle rotatably mounted in the last said housing, gearing connecting the drive shaft with the axle, and a torsion spring mounted in the space between and joining the casing flange with the tube flange, the torsion spring comprising a pair of annular metallic disks severally connected with the casing and tube flanges, and an annular member of a resilient solid fixed on and compressibly and elastically joining the disks for restraining oscillation of the axle about the drive shaft axis and for absorbing shocks and vibrations acting on the axle and the wheel housing.

RICHARD B. HOPKINS.

References Cited in the file of this patent

UNITED STATES PATENTS

| Number | Name | Date |
|---|---|---|
| 1,692,881 | Wright | Nov. 27, 1928 |
| 1,943,721 | Carpenter et al. | Jan. 16, 1934 |
| 2,043,542 | Johnson | June 9, 1936 |
| 2,049,474 | Smith | Aug. 4, 1936 |
| 2,199,684 | Wilson et al. | May 7, 1940 |
| 2,286,609 | Ledwinka | June 16, 1942 |